US012347241B2

(12) United States Patent
Usami

(10) Patent No.: US 12,347,241 B2
(45) Date of Patent: Jul. 1, 2025

(54) VEHICLE DIAGNOSIS METHOD AND INFORMATION PRESENTATION METHOD

(71) Applicant: Panasonic Intellectual Property Management Co., Ltd., Osaka (JP)

(72) Inventor: Riku Usami, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 190 days.

(21) Appl. No.: 18/075,834

(22) Filed: Dec. 6, 2022

(65) Prior Publication Data

US 2023/0186690 A1 Jun. 15, 2023

(30) Foreign Application Priority Data

Dec. 13, 2021 (JP) ................................ 2021-201487

(51) Int. Cl.
*G07C 5/00* (2006.01)
*G07C 5/08* (2006.01)

(52) U.S. Cl.
CPC ............ *G07C 5/006* (2013.01); *G07C 5/008* (2013.01); *G07C 5/0808* (2013.01); *G07C 5/0825* (2013.01); *G07C 5/085* (2013.01)

(58) Field of Classification Search
CPC ...... G07C 5/006; G07C 5/008; G07C 5/0808; G07C 5/0825; G07C 5/085
USPC ........................................................ 701/29.1
See application file for complete search history.

(56) References Cited

U.S. PATENT DOCUMENTS 10,223,842 B1 * 3/2019 Lee .......................... G01H 3/00
2006/0253282 A1 * 11/2006 Schmidt ............... G07C 5/0808 704/233
2017/0358151 A1 * 12/2017 Koons ...................... G07C 5/08
2021/0049444 A1 * 2/2021 Bielby .................. G06N 3/088
2021/0209871 A1 * 7/2021 Lee ...................... G07C 5/0841

FOREIGN PATENT DOCUMENTS

JP 2021-92448 6/2021

* cited by examiner

*Primary Examiner* — Mahmoud S Ismail
(74) *Attorney, Agent, or Firm* — Greenblum & Bernstein, P.L.C.

(57) ABSTRACT

A computer of a vehicle diagnosis system acquires a sound produced in a traveling vehicle. The computer of the vehicle diagnosis system diagnoses a status of the vehicle based on the sound acquired. The computer of the vehicle diagnosis system causes a diagnosis result indicating the status of the vehicle to be output from an apparatus mounted on the vehicle.

19 Claims, 6 Drawing Sheets

| MANNER OF PRODUCTION OF ABNORMAL SOUND | SITE WHERE SOUND IS PRODUCED | SITUATION IN WHICH SOUND IS PRODUCED | CAUSE | METHOD OF HANDLING |
|---|---|---|---|---|
| *KYURU KYURU* (SQUEAKING SOUND) | ENGINE ROOM | WHEN ENGINE STARTS | DEGRADATION OF BELT USED AROUND ENGINE | CHECK IN MAINTENANCE FACTORY |
| *KIN KIN/KAN KAN* (TINKLING/METALLIC SOUND) | ENGINE ROOM | WHEN ENGINE STARTS | TERMINAL CONDITION OF OVERHEAT | STOP VEHICLE AT SAFE PLACE AS EARLY AS POSSIBLE AND REQUEST RESCUE |
| *KEE KEE* (SCREECHING SOUND) | BRAKE | WHEN BRAKE IS USED | CONTACT OF METALLIC FITTINGS FROM BRAKE WEAR | CHECK VEHICLE IN MAINTENANCE FACTORY AT EARLY STAGE |
| *GORO GORO/GARA GARA* (RUMBLING/RATTLING SOUND) | MISSION SYSTEM | WHEN ACCELERATOR IS USED | SHORTAGE OF ENGINE OIL | STOP VEHICLE AT SAFE PLACE AND REQUEST RESCUE |
| *GO GO/GORO GORO* (ROADING/RUMBLING SOUND) | BENEATH CABIN FLOOR | WHILE VEHICLE IS TRAVELING | BROKEN POWER TRANSMISSION PARTS | CHECK VEHICLE IN MAINTENANCE FACTORY AT EARLY STAGE |
| *BARA BARA* (SOUND OF SOMETHING FALLING APART) | MUFFLER | WHILE VEHICLE IS TRAVELING | BROKEN MUFFLER | CHECK VEHICLE IN MAINTENANCE FACTORY |

FIG. 1

| MANNER OF PRODUCTION OF ABNORMAL SOUND | SITE WHERE SOUND IS PRODUCED | SITUATION IN WHICH SOUND IS PRODUCED | CAUSE | METHOD OF HANDLING |
|---|---|---|---|---|
| *KYURU KYURU* (SQUEAKING SOUND) | ENGINE ROOM | WHEN ENGINE STARTS | DEGRADATION OF BELT USED AROUND ENGINE | CHECK IN MAINTENANCE FACTORY |
| *KIN KIN/KAN KAN* (TINKLING/METALLIC SOUND) | ENGINE ROOM | WHEN ENGINE STARTS | TERMINAL CONDITION OF OVERHEAT | STOP VEHICLE AT SAFE PLACE AS EARLY AS POSSIBLE AND REQUEST RESCUE |
| *KEE KEE* (SCREECHING SOUND) | BRAKE | WHEN BRAKE IS USED | CONTACT OF METALLIC FITTINGS FROM BRAKE WEAR | CHECK VEHICLE IN MAINTENANCE FACTORY AT EARLY STAGE |
| *GORO GORO/GARA GARA* (RUMBLING/RATTLING SOUND) | MISSION SYSTEM | WHEN ACCELERATOR IS USED | SHORTAGE OF ENGINE OIL | STOP VEHICLE AT SAFE PLACE AND REQUEST RESCUE |
| *GO GO/GORO GORO* (ROADING/RUMBLING SOUND) | BENEATH CABIN FLOOR | WHILE VEHICLE IS TRAVELING | BROKEN POWER TRANSMISSION PARTS | CHECK VEHICLE IN MAINTENANCE FACTORY AT EARLY STAGE |
| *BARA BARA* (SOUND OF SOMETHING FALLING APART) | MUFFLER | WHILE VEHICLE IS TRAVELING | BROKEN MUFFLER | CHECK VEHICLE IN MAINTENANCE FACTORY |

VEHICLE DIAGNOSIS METHOD AND INFORMATION PRESENTATION METHOD

CROSS-REFERENCE TO RELATED APPLICATION

This application is based upon and claims the benefit of priority from the prior Japanese Patent Application No. 2021-201487, filed on Dec. 13, 2021, the entire contents of which are incorporated herein by reference.

BACKGROUND

1. Field

The present disclosure relates to data processing technology and, more particularly, to a vehicle diagnosis method and an information presentation method.

2. Description of the Related Art

Aged deterioration or failure of components may result in a traveling vehicle producing a sound different from normal (hereinafter, referred to as "abnormal sound"). Patent literature 1 below proposes a sound processing system in which a dedicated sound collection device is provided in a vehicle to detect an abnormal sound produced in the vehicle (see, for example, patent literature 1).

[Patent literature 1] JP2021-92448

When an abnormal sound is produced in a traveling vehicle, it is currently difficult for a non-expert vehicle passenger to determine the cause of the abnormal sound promptly and deal with the sound properly.

SUMMARY

The present disclosure addresses the above-described issue, and a purpose thereof is to provide a technology of helping a passenger of a traveling vehicle to deal with an abnormal sound produced in the vehicle.

A vehicle diagnosis method according to an embodiment of the present disclosure is a vehicle diagnosis method executed in a device that communicates with a vehicle-mounted apparatus and includes a database that records an abnormal sound in association with a vehicle status, the method including: acquiring a sound transmitted from the vehicle-mounted apparatus and produced in a traveling vehicle; diagnosing a status of the vehicle based on the sound acquired; and transmitting a diagnosis result on the status of the vehicle to the vehicle-mounted apparatus.

Another embodiment of the present disclosure relates to an information presentation method. The method is an information presentation method executed in a vehicle-mounted apparatus that communicates with a device including a database that records an abnormal sound in association with a vehicle status, the method including: transmitting a sound produced in a traveling vehicle to the device; acknowledging a diagnosis result transmitted from the device and indicating a status of the vehicle based on the sound; and outputting the diagnosis result from an output unit.

Optional combinations of the aforementioned constituting elements, and implementations of the present disclosure in the form of apparatuses, systems, vehicle provided with an apparatus or a system, computer programs, recording media encoded with computer programs, etc. may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 1 shows patterns in which abnormal sound is produced;

DETAILED DESCRIPTION

Figure 2:
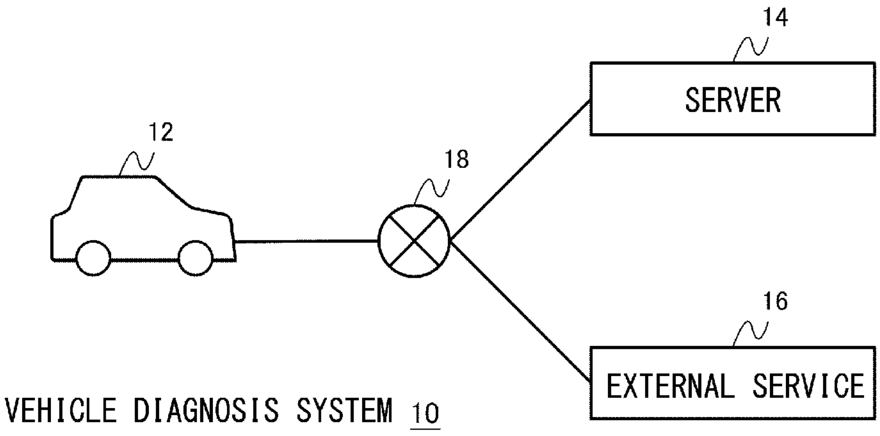
FIG. 2 shows a configuration of a vehicle diagnosis system according to the embodiment.

The invention will now be described by reference to the preferred embodiments. This does not intend to limit the scope of the present invention, but to exemplify the invention.

The device or the entity that executes the method according to the disclosure is provided with a computer. By causing the computer to run a program, the function of the device or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The terms IC and LSI may change depending on the integration degree, and the processor may be comprised of a system LSI, a very large scale integration (VLSI), or an ultra large scale integration (USLI). A field programmable gate array (FPGA), which is programmed after an LSI is manufactured, or a reconfigurable logic device, in which connections inside the LSI can be reconfigured or circuit compartments inside the LSI can be set up, can be used for the same purpose. The plurality of electronic circuits may be integrated in one chip or provided in a plurality of chips. The plurality of chips may be aggregated in one device or provided in a plurality of apparatuses. The program may be recorded in a non-transitory recording medium such as a computer-readable read only memory (ROM), optical disk, and hard disk drive or recorded in a non-transitory storage medium such as a computer-readable random access memory (RAM). The program may be stored in a recording medium in advance or supplied to a recording medium or a storage medium via a wide area communication network including the Internet.

A summary of the embodiment will first be described. Aged deterioration or failure of components may result in a traveling vehicle producing a sound different from normal (hereinafter, referred to as "abnormal sound"). Abnormal sound can be said to be sound different from sound normally produced while a vehicle is traveling normally and can be said to be sound that is not produced in an normal vehicle. A variety of causes may produce an abnormal sound, and the importance and the solution differ depending on the cause.

FIG. 1 shows patterns in which abnormal sound is produced. The cause of an abnormal sound differs depending on a combination of how the abnormal sound is produced, the site where the abnormal sound is produced, and the situation (which can be said to be an operating status of the vehicle) in which the abnormal sound is produced, and the method of handling differs depending on the cause. In the case of abnormal sound "goro goro", for example, it is necessary to stop the traveling vehicle at a safe place and request for a rescue if the abnormal sound is produced in the mission system. It the same sound is produced beneath the cabin floor, on the other hand, it is only necessary to have the vehicle checked in a maintenance factory at an early opportunity.

Patent literature 1 mentioned above proposes a sound processing system in which a dedicated sound collection device is provided in a vehicle to detect an abnormal sound produced in the vehicle. Patent literature 1 describes a sound processing system in which the sound volume level or the frequency characteristics of a sound detected by the sound sensor is displayed on the display of a PC. It is, however, difficult for a non-expert vehicle passenger (the driver, etc.) to determine the cause of the abnormal sound or a method of handling.

In this background, an information processing system (the vehicle diagnosis system 10 described below) is proposed in the embodiment capable of diagnosing the status of a traveling vehicle based on the sound produced in the vehicle and outputting a diagnosis result to the vehicle-mounted apparatus of the vehicle. The system according to the embodiment can help a passenger of a traveling vehicle to deal with an abnormal sound produced in the vehicle properly.

The embodiment will be described in detail. FIG. 2 shows a configuration of a vehicle diagnosis system according to the embodiment. The vehicle diagnosis system 10 includes a vehicle 12, a server 14, and an external service 16. The elements of the vehicle diagnosis system 10 are connected via a communication network 18 that could include LAN, WAN, the internet, etc.

The server 14 is an information processing apparatus that provides abnormal sound diagnosis service to the vehicle 12. The external service 16 is an apparatus or a system of an external service that supports vehicle passengers or repairs/maintains vehicles. The external service 16 may, for example, include an apparatus or a system that provides an operator service, a rescue service, a maintenance factory reservation service, etc.

Figure 3:
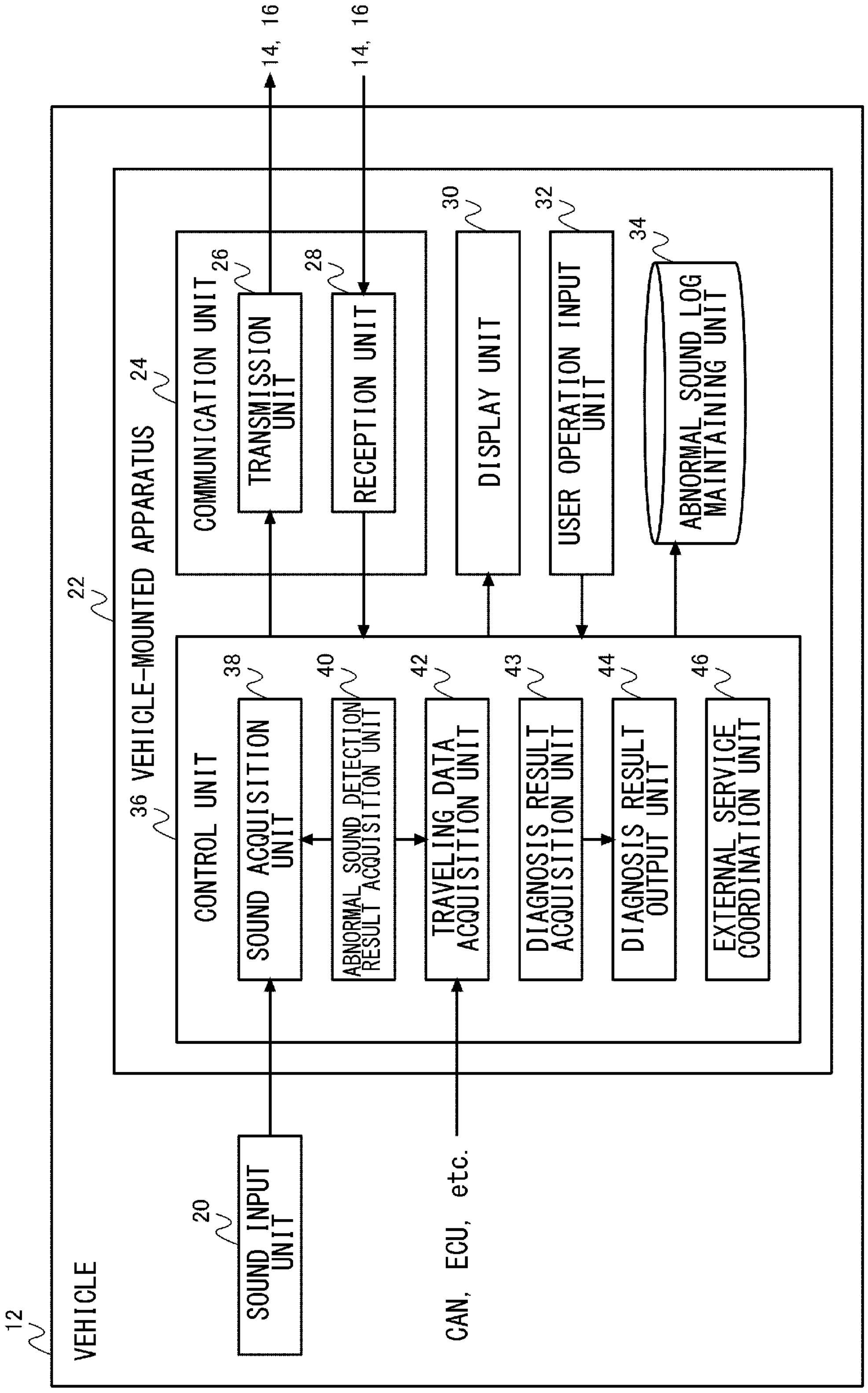
FIG. 3 is a block diagram showing functional blocks of the vehicle of FIG. 2.

FIG. 3 is a block diagram showing functional blocks of the vehicle 12 of FIG. 2. The blocks depicted in the block diagram of this disclosure are implemented in hardware such as devices and mechanical apparatus exemplified by a CPU and a memory of a computer, and in software such as a computer program. FIG. 3 depicts functional blocks implemented by the cooperation of these elements. Therefore, it will be understood by those skilled in the art that the functional blocks may be implemented in a variety of manners by a combination of hardware and software.

The vehicle 12 includes a sound input unit 20 and a vehicle-mounted apparatus 22. The sound input unit 20 includes a microphone provided toward the front of the vehicle cabin of the vehicle 12 (e.g., below the steering wheel). The sound input unit 20 inputs sound data derived from converting the sound in the vehicle 12 into an electric signal to the vehicle-mounted apparatus 22. The sound data includes data indicating the sound volume, frequency characteristics, and direction (more specifically, the direction from the microphone toward the sound source) of the sound in the vehicle 12.

The vehicle-mounted apparatus 22 is an information processing apparatus mounted on the vehicle 12. The vehicle-mounted apparatus 22 may be, for example, an apparatus of a car navigation system or an apparatus of an In-Vehicle Infotainment (IVI) system. The vehicle-mounted apparatus 22 includes a communication unit 24, a display unit 30, a user operation input unit 32, an abnormal sound log maintaining unit 34, and a control unit 36.

The communication unit 24 communicates with an external apparatus in accordance with a predetermined communication protocol. The communication unit 24 includes a transmission unit 26 and a reception unit 28. The transmission unit 26 transmits data output from the control unit 36 to the server 14 or the external service 16. The reception unit 28 inputs data transmitted from the server 14 or the external service 16 to the control unit 36.

The display unit 30 displays various information under the control of the control unit 36. The user operation input unit 32 acknowledges a user operation input and delivers information on the user operation input by the user to the control unit 36. The display unit 30 and the user operation input unit 32 may be integrated and may be implemented by, for example, a touch screen.

The abnormal sound log maintaining unit 34 stores data for an abnormal sound log. The abnormal sound log includes sound data and traveling data acquired when the abnormal sound is produced and also includes a diagnosis result based on the data.

The control unit 36 executes various data processes. The control unit 36 may be implemented by the processor (CPU, Electronic Control Unit (ECU), etc.) of the vehicle-mounted apparatus 22. The control unit 36 includes a sound acquisition unit 38, an abnormal sound detection result acquisition unit 40, a traveling data acquisition unit 42, a diagnosis result acquisition unit 43, a diagnosis result output unit 44, an external service coordination unit 46. These plurality of functional blocks may be implemented in a computer program, and the computer program may be installed in the storage of the vehicle-mounted apparatus 22. The processor of the vehicle-mounted apparatus 22 may cause the plurality of functional blocks above to exhibit their functions by reading the computer program into the main memory and running the program.

The sound acquisition unit 38 acquires data for the sound produced in the traveling vehicle 12 and input from the sound input unit 20. The abnormal sound detection result acquisition unit 40 acquires an abnormal sound detection result provided from the server 14. The abnormal sound detection result is information indicating whether an abnormal sound is produced.

The traveling data acquisition unit 42 acquires traveling data for the vehicle 12. The traveling data includes the speed, acceleration, engine revolution, steering angle, and brake operating condition of the vehicle 12. The traveling data acquisition unit 42 may acquire the traveling data from the bus of the Controller Area Network (CAN) of the vehicle 12 or acquire the traveling data from one or a plurality of ECUs provided in the vehicle 12.

The diagnosis result acquisition unit 43 acquires the result of diagnosis of the status of the vehicle 12 provided from the server 14. The diagnosis result output unit 44 causes the result of diagnosis of the status of the vehicle 12 provided from the server 14 (acquired by the diagnosis result acquisition unit 43) to be output from an apparatus mounted on the vehicle 12. In the embodiment, the diagnosis result output unit 44 transmits the data for the screen showing the diagnosis result to the display unit 30 and causes the display unit 30 display the screen for the diagnosis result. In a variation, the diagnosis result output unit 44 may, when the diagnosis result comprises sound data, transmit data for the sound indicating the diagnosis result to a speaker (not shown) in the vehicle 12 and cause the speaker to output the sound of the diagnosis result.

Further, the diagnosis result output unit 44 stores the abnormal sound log including the diagnosis result indicating the status of the vehicle 12 and including the sound data and the traveling data used in the diagnosis, in the abnormal sound log maintaining unit 34.

The external service coordination unit 46 uses the external service (e.g., the operator service) by transmitting and receiving various data to and from the external service 16 via the communication unit 24.

Figure 4:
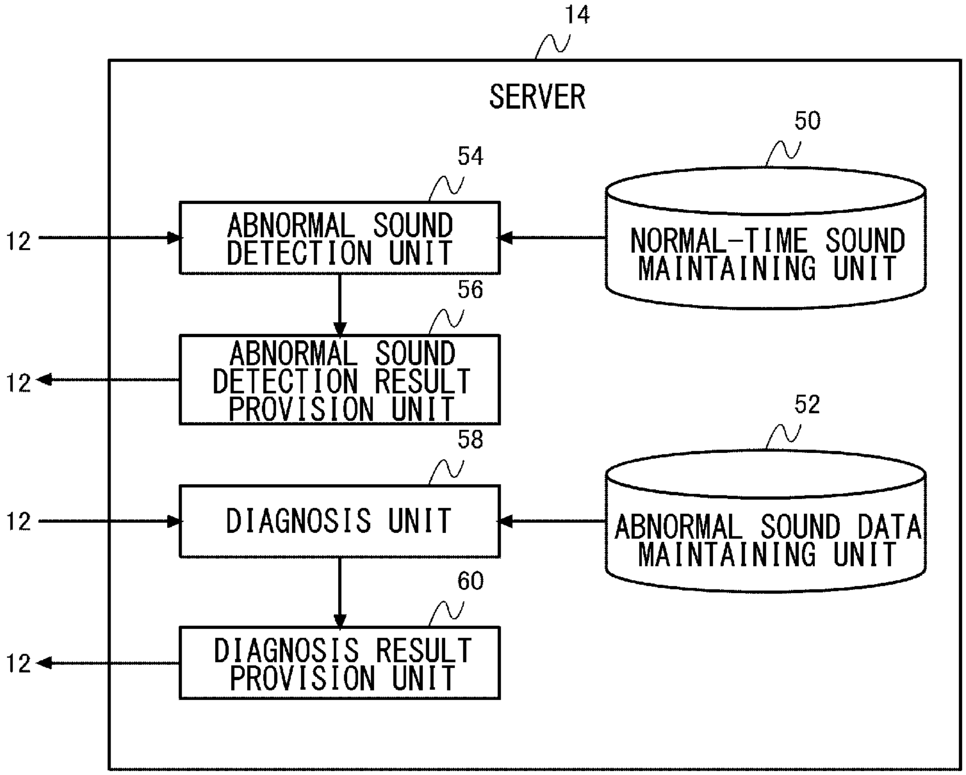
FIG. 4 is a block diagram showing functional blocks of the server of FIG. 2.

FIG. 4 is a block diagram showing functional blocks of the server 14 of FIG. 2. The server 14 includes a normal-time sound maintaining unit 50, an abnormal sound data maintaining unit 52, an abnormal sound detection unit 54, an abnormal sound detection result provision unit 56, a diagnosis unit 58, and a diagnosis result provision unit 60. The normal-time sound maintaining unit 50 and the abnormal sound data maintaining unit 52 may be implemented by the storage of the server 14. The abnormal sound detection unit 54, the abnormal sound detection result provision unit 56, the diagnosis unit 58, and the diagnosis result provision unit 60 may be implemented in a computer program. The processor of the server 14 (CPU, etc.) may exhibit the functions of the plurality of function blocks above by reading the above computer program stored in the storage into the main memory and running the program.

The normal-time sound maintaining unit 50 stores data indicating patterns of the sound (hereinafter, referred to as "normal-time sound") expected to be detected by the sound input unit 20 when the vehicle 12 is traveling normally (i.e., while the vehicle 12 in a normal status is traveling). The normal-time sound may include a road noise generated when the vehicle 12 is traveling but not include an abnormal sound. The pattern data for the normal-time sound includes data indicating the sound volume, frequency characteristics, and direction (the direction from the sound input unit 20 toward the sound source) of the normal-time sound.

The abnormal sound data maintaining unit 52 is a database that records the abnormal sound and the vehicle status in association with each other. More specifically, the abnormal sound data maintaining unit 52 stores a plurality of items of abnormal sound data, each of which is data that associates a combination of an abnormal sound pattern and a traveling data pattern with a diagnosis result. The plurality of items of abnormal sound data comprise mutually different combinations of abnormal sound patterns and traveling data patterns, combined with mutually different diagnosis results.

The abnormal sound pattern includes data indicating the sound volume, frequency characteristics, and direction (the direction from the sound input unit 20 toward the sound source) of the abnormal sound (or a mixture of the abnormal sound with the other sound). The traveling data pattern includes data indicating the speed, acceleration, engine revolution, steering angle, and brake operating condition of the vehicle 12. The diagnosis result includes information (in the embodiment, a text and an image) on the site where the abnormal sound is produced and the method of handling. The method of handling includes information related to an action (e.g., stopping the vehicle 12, etc.) that the passenger of the vehicle 12 should take.

The abnormal sound detection unit 54 detects the abnormal sound produced in the vehicle 12 by comparing the sound data related to the current traveling sound of the vehicle 12 transmitted from the vehicle 12 (acquired by the sound acquisition unit 38 of the vehicle 12) with the pattern data for the normal-time sound stored in the normal-time sound maintaining unit 50.

The abnormal sound detection result provision unit 56 transmits data (e.g., information indicating whether an abnormal sound is produced) indicating the result of detection of the abnormal sound by the abnormal sound detection unit 54 to the vehicle 12.

When the abnormal sound detection unit 54 detects that an abnormal sound is produced in the vehicle 12, the diagnosis unit 58 diagnoses the status of the vehicle 12 based on the sound data and the traveling data for the vehicle 12 acquired from the vehicle 12 (the vehicle-mounted apparatus 22). More specifically, the diagnosis unit 58 acknowledges the sound data related to the current traveling sound of the vehicle 12 transmitted from the vehicle 12 (in other words, acquired by the sound acquisition unit 38 of the vehicle 12) and the traveling data transmitted from the vehicle 12 (in other words, acquired by the traveling data acquisition unit 42 of the vehicle 12). The diagnosis unit 58 generates a diagnosis result by comparing the sound data and the traveling data for the vehicle 12 with the abnormal sound data stored in the abnormal sound data maintaining unit 52.

The diagnosis result provision unit 60 transmits the data for the diagnosis result generated by the diagnosis unit 58 to the vehicle 12 (the vehicle-mounted apparatus 22).

A description will now be given of the operation of the vehicle diagnosis system 10 having the above-described configuration.

Figure 5:
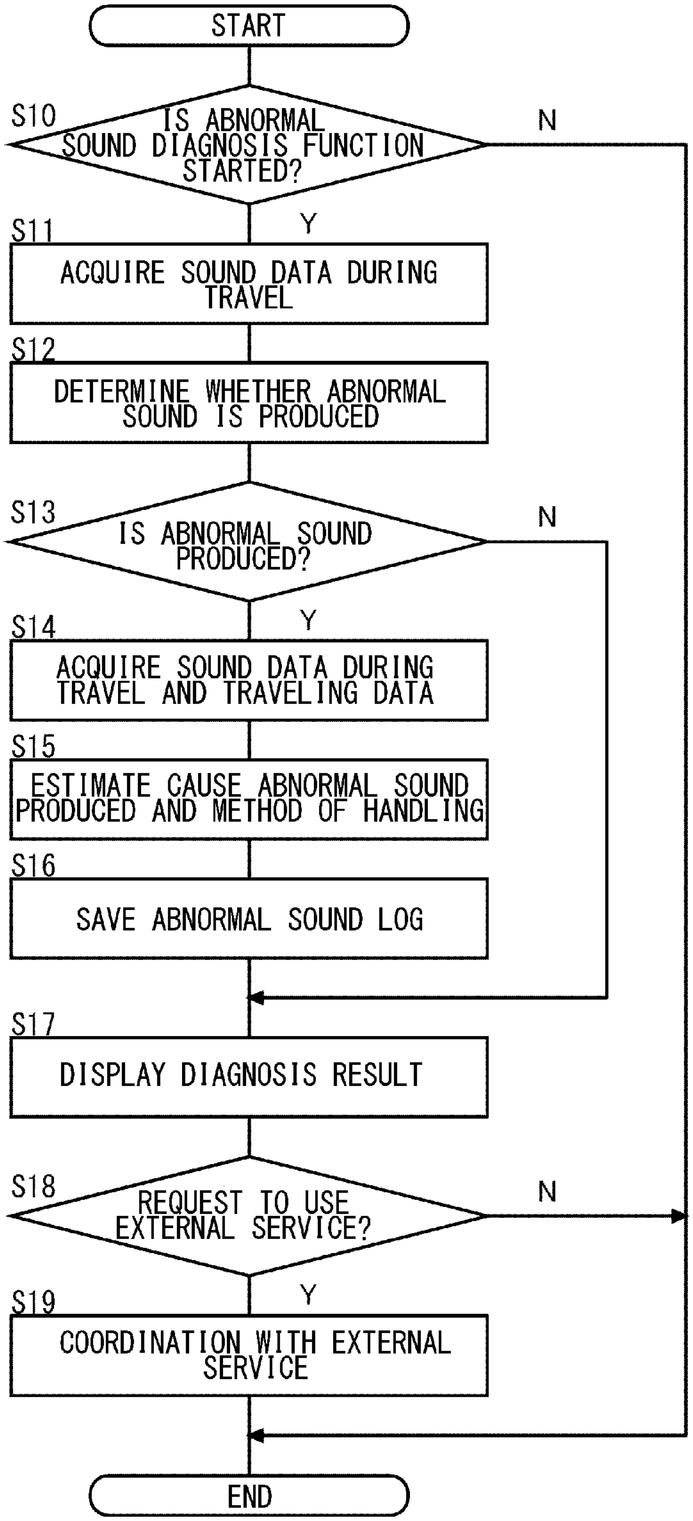
FIG. 5 is a flowchart showing the operation of the vehicle diagnosis system.

FIG. 5 is a flowchart showing the operation of the vehicle diagnosis system 10. When the passenger (e.g., the driver) of the vehicle 12 notices a sound different from normal is produced while the vehicle 12 is traveling, the passenger enters a predetermined user operation for starting the abnormal sound diagnosis function in the vehicle-mounted apparatus 22. When the user operation input unit 32 of the vehicle-mounted apparatus 22 acknowledges a user operation for starting the abnormal sound diagnosis function (Y in S10), the sound acquisition unit 38 of the vehicle-mounted apparatus 22 acquires the sound data related to the sound produced in the traveling vehicle 12 via the sound input unit 20 (S11). The sound acquisition unit 38 transmits the acquired sound data to the server 14 via the transmission unit 26.

The abnormal sound detection unit 54 of the server 14 determines whether an abnormal sound is produced in the vehicle 12 by comparing the sound data transmitted from the vehicle 12 with the pattern data for the normal-time sound stored in the normal-time sound maintaining unit 50 (S12). More specifically, the abnormal sound detection unit 54 may determine that an abnormal sound is produced in the vehicle 12 when the difference between the combination of the sound volume, frequency characteristics, and direction indicated by the sound data transmitted from the vehicle 12 and the combination of the sound volume, frequency characteristics, and direction indicated by the pattern data for the normal-time sound exceeds a predetermined threshold value.

Further, the abnormal sound detection unit 54 may determine that an abnormal sound is not produced in the vehicle 12 when the combination of the sound volume, frequency characteristics, and direction indicated by the sound data transmitted from the vehicle 12 matches the combination of the sound volume, frequency characteristics, and direction indicated by the pattern data for the normal-time sound or when the difference is equal to or smaller than the above threshold value. An appropriate threshold value may be determined based on the knowledge of the developer of the vehicle diagnosis system 10 or experiments using the vehicle diagnosis system 10.

The abnormal sound detection result provision unit 56 of the server 14 transmits an abnormal sound detection result indicating whether an abnormal sound is produced to the vehicle 12. The abnormal sound detection result acquisition unit 40 of the vehicle-mounted apparatus 22 acquires the abnormal sound detection result transmitted from the server 14 via the reception unit 28. When the abnormal sound detection result indicates that an abnormal sound is produced (Y in S13), the sound acquisition unit 38 of the vehicle-mounted apparatus 22 acquires the sound data related to the sound produced in the traveling vehicle 12, and the traveling data acquisition unit 42 of the vehicle-mounted apparatus 22 acquires the traveling data for the traveling vehicle 12 (S14). The sound acquisition unit 38 transmits the acquired sound data to the server 14 via the transmission unit 26. The traveling data acquisition unit 42 transmits the acquired traveling data to the server 14 via the transmission unit 26.

The diagnosis unit 58 of the server 14 estimates the cause of the abnormal sound produced in the vehicle 12 and the method of handling, by comparing the sound data and the traveling data transmitted from the vehicle 12 with the abnormal sound data stored in the abnormal sound data maintaining unit 52 (S15).

More specifically, the diagnosis unit 58 refers to the plurality of items of abnormal sound data stored in the abnormal sound data maintaining unit 52 to identify, as relevant abnormal sound data, the abnormal sound data that defines an abnormal sound pattern and a traveling data pattern identical to or similar to the sound data (a combination of the sound volume, frequency characteristics, and direction) and the traveling data (a combination of the speed, acceleration, engine revolution, steering angle, and brake operating condition) transmitted from the vehicle 12. A determination that the data are similar may be made when the difference is within a predetermined threshold value, and the threshold value may be determined based on the developer's knowledge or experiments. For identification of the relevant abnormal sound data, a publicly known search technology or machine learning may be used.

The diagnosis unit 58 generates diagnosis result data that includes a diagnosis result defined by the relevant abnormal sound (the site where the abnormal sound is produced and the method of handling) and evidence information on the diagnosis result (in the embodiment, the sound waveform and the frequency characteristic data for the sound data used in the diagnosis process). The diagnosis result provision unit 60 of the server 14 transmits the diagnosis result data generated by the diagnosis unit 58 to the vehicle 12.

The diagnosis result output unit 44 of the vehicle-mounted apparatus 22 acquires the diagnosis result data transmitted from the server 14 via the reception unit 28. The diagnosis result output unit 44 stores an abnormal sound log in the abnormal sound log maintaining unit 34, the abnormal sound log including (1) the sound data acquired by the sound acquisition unit 38 and transmitted to the server 14, (2) the traveling data acquired by the traveling data acquisition unit 42 and transmitted to the server 14, and (3) the diagnosis result data indicating the result of diagnosis based on the data of (1) and (2) and transmitted from the server 14 (S16). This supports the analytical work by the external service (e.g., a sales outlet or a repair factory). When the abnormal sound detection result transmitted from the server 14 indicates that an abnormal sound is not detected (N in S13), the steps of S14-S16 are skipped.

Figure 6:
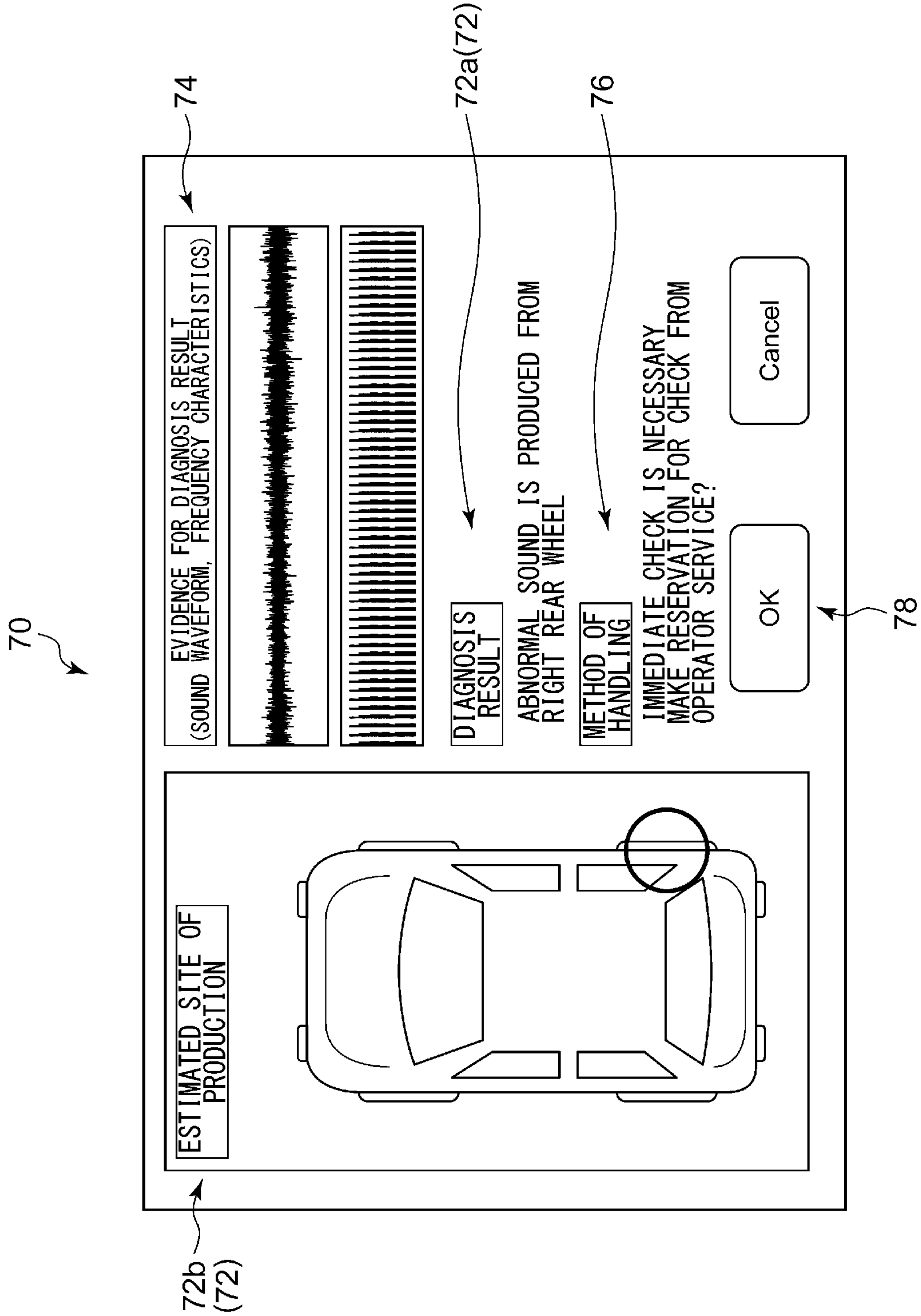
FIG. 6 shows an example of the diagnosis result screen.

Further, the diagnosis result output unit 44 generates data for a diagnosis result screen based on the diagnosis result data transmitted from the server 14. The diagnosis result output unit 44 causes the display unit 30 to display the diagnosis result screen by outputting the data for the diagnosis result screen to the display unit 30 (S17). FIG. 6 shows an example of the diagnosis result screen. A diagnosis result screen 70 includes abnormal sound site information 72 (72*a*, 72*b*), evidence information 74, and a method of handling 76 corresponding to the respective items of the diagnosis result data transmitted from the server 14.

The abnormal sound site information 72*a* comprises a text showing a site where the abnormal sound is estimated to be produced. The abnormal sound site information 72*b* is an image showing a site where the abnormal sound is estimated to be produced. The evidence information 74 presents the sound waveform and the frequency characteristics of the sound data used in the diagnosis process. The method of handling 76 is information indicating an action that the passenger (typically, the driver) of the vehicle 12 should take. The method of handling may comprise the method of handling shown in FIG. 1.

When the abnormal sound detection result transmitted from the server 14 indicates that an abnormal sound is not detected (i.e., when the steps of S14-S16 are skipped), the diagnosis result output unit 44 may cause the display unit 30 to display a diagnosis result indicating that an abnormal sound is not detected in the step of S17.

As shown in FIG. 6, the method of handling on the diagnosis result screen 70 could include content to propose using an external service (e.g., make a reservation for a check by using the operator service). In the diagnosis result screen 70 of FIG. 6, the passenger of the vehicle 12 desiring to make a reservation for a check by using the operator service selects an OK button 78.

When a user operation requesting the use of an external service is entered in the diagnosis result screen 70 (e.g., when the OK button 78 is selected in the diagnosis result screen 70 of FIG. 6) (Y in S18), the external service coordination unit 46 transmits and receives various data necessary to use the service to and from the external service (S19). When a user operation requesting the use of an external service is not entered in the diagnosis result screen 70 (N in S18), the step of S19 is skipped.

For example, the external service coordination unit 46 may request the operator service to make a call in the step of S19. Alternatively, the external service coordination unit 46 may transmit data for making a reservation for maintenance in an automobile sales outlet or a factory. Alternatively, the external service coordination unit 46 may transmit an abnormal sound log (e.g., sound data, traveling data, diagnosis result, etc.) to a database provided in an automobile company that can be referred to from the operator service or the repair service to register the log.

When the user operation input unit 32 of the vehicle-mounted apparatus 22 does not acknowledge a user operation for starting the abnormal sound diagnosis function (N in S10), S11 and the subsequent steps are skipped.

The vehicle diagnosis system 10 of the embodiment can help a passenger of the traveling vehicle 12 to deal with an abnormal sound produced in the vehicle properly and can improve the safety and satisfaction of the passenger. The vehicle diagnosis system 10 of the embodiment also makes it possible to avoid tight system resources of the vehicle-mounted apparatus 22 by executing the abnormal sound detection process and the diagnosis process in the server 14.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

A description will be given of a variation. In the vehicle diagnosis system 10 of the embodiment, the abnormal sound detection process is started in response to a user operation to start the abnormal sound diagnosis function initiated by the passenger of the vehicle 12. In a variation, the abnormal sound detection process may be executed automatically. More specifically, the sound acquisition unit 38 of the vehicle-mounted apparatus 22 may repeatedly acquire the sound in the vehicle 12, and the abnormal sound detection unit 54 of the server may repeat the abnormal sound detection process periodically regardless of whether a user operation is provided by the passenger. When an abnormal sound is detected, the vehicle-mounted apparatus 22 and the server 14 may execute the diagnosis process (S14 and the subsequent steps) described with reference to FIG. 5.

A description will be given of another variation. In the vehicle diagnosis system 10 of the embodiment, the server 14 executes the abnormal sound detection process and the diagnosis process. In a variation, the vehicle-mounted apparatus 22 of the vehicle 12 may execute the abnormal sound detection process and the diagnosis process. In other words, the vehicle-mounted apparatus 22 may be configured to include the abnormal sound detection unit 54 and the diagnosis unit 58. The normal-time sound maintaining unit 50 and the abnormal sound data maintaining unit 52 may be provided in the server 14 or may be provided in the vehicle-mounted apparatus 22.

In still another variation, the abnormal sound detection process and the diagnosis process may be executed both in the server 14 and the vehicle-mounted apparatus 22. In this case, the abnormal sound detection unit 54 of each of the server 14 and the vehicle-mounted apparatus 22 may derive a probability value indicating the probability of the abnormal sound detection result. Similarly, the diagnosis unit 58 of each of the server 14 and the vehicle-mounted apparatus 22 may derive a probability value indicating the probability of the diagnosis result. The control unit 36 of the vehicle-mounted apparatus 22 may employ the abnormal sound detection result yielded by the abnormal sound detection unit 54 of the server or the abnormal sound detection result yielded by the abnormal sound detection unit 54 of the vehicle-mounted apparatus 22 having a higher probability of the abnormal sound detection result and may proceed with the process accordingly. Similarly, the control unit 36 of the vehicle-mounted apparatus 22 may employ the diagnosis result yielded by the diagnosis unit 58 of the server 14 or the diagnosis result yielded by the diagnosis unit 58 of the vehicle-mounted apparatus 22 having a higher probability of the diagnosis result and may proceed with the process accordingly.

A description will be given of yet another variation. In the embodiment described above, the diagnosis result output unit 44 of the vehicle-mounted apparatus 22 causes the display unit 30 of the vehicle-mounted apparatus 22 to display the diagnosis result. In a variation, the diagnosis result output unit 44 of the vehicle-mounted apparatus 22 may cause a display apparatus (e.g., a head-up display, etc.) different from the vehicle-mounted apparatus 22 to display the diagnosis result. Alternatively, the diagnosis result output unit 44 of the vehicle-mounted apparatus 22 may output the data for the diagnosis result to a terminal of the passenger (smartphone, etc.) connected wirelessly to the vehicle-mounted apparatus 22 and cause the terminal of the passenger to display the diagnosis result.

Any combination of the embodiment and the variation described above will also be useful as an embodiment of the present disclosure. A new embodiment created by a combination will provide the combined advantages of the embodiment and the variation as combined. It will be understood to a skilled person that the functions that the constituting elements recited in the claims should achieve are implemented either alone or in combination by the constituting elements shown in the embodiments and the variations.

The technology disclosed in the embodiment and the variation may be defined by the modes described in the following items.

[Item 1]

A vehicle diagnosis method executed in a device that communicates with a vehicle-mounted apparatus and includes a database that records an abnormal sound in association with a vehicle status, the method including: acquiring a sound transmitted from the vehicle-mounted apparatus and produced in a traveling vehicle; diagnosing a status of the vehicle based on the sound acquired; and transmitting a diagnosis result on the status of the vehicle to the vehicle-mounted apparatus.

The vehicle diagnosis method can help the passenger of the vehicle to handle an abnormal sound produced in the traveling vehicle and improve the safety and satisfaction of the passenger.

[Item 2]

The vehicle diagnosis method according to item 1, further including: acquiring traveling data for the vehicle; and diagnosing the status of the vehicle based on the sound acquired and the traveling data acquired.

The vehicle diagnosis method can increase the accuracy of diagnosis of the status of the vehicle by also allowing for the traveling data for the vehicle.

[Item 3]

The vehicle diagnosis method according to item 1, wherein the diagnosis result includes information related to an action that the passenger of the vehicle should take.

The vehicle diagnosis method can more effectively help the passenger to handle the abnormal sound properly.

[Item 4]

The vehicle diagnosis method according to any item 1, wherein an abnormal sound is detected by comparing current traveling sound acquired and traveling sound in normal times, and the status of the vehicle is diagnosed when the abnormal sound is detected.

The vehicle diagnosis method can automatically detect an abnormal sound not detected by the passenger of the vehicle and can further improve the safety and satisfaction of the passenger.

[Item 5]

An information presentation method executed in a vehicle-mounted apparatus that communicates with a device including a database that records an abnormal sound in association with a vehicle status, the method including: transmitting a sound produced in a traveling vehicle to the device; acknowledging a diagnosis result transmitted from the device and indicating a status of the vehicle based on the sound; and outputting the diagnosis result from an output unit.

The information presentation method can help the passenger of the vehicle to handle an abnormal sound produced in the traveling vehicle and improve the safety and satisfaction of the passenger.

[Item 6]

The information presentation method according to item 5, wherein data for the sound used in a diagnosis by the device is saved.

The information presentation method can support detailed check in a sales outlet or a factory and can reduce the trouble of the sales outlet or the factory in the case of an abnormal sound that cannot be reproduced, by saving the sound data used in the diagnosis.

[Item 7]

The information presentation method according to item 5, wherein the diagnosis result includes content that prompts one to use a predetermined service, and the method includes communicating with an apparatus related to the service in accordance with a user operation of the passenger of the vehicle.

The information presentation method can help the passenger of the vehicle to handle an abnormal sound produced in the traveling vehicle properly.

While various embodiments have been described herein above, it is to be appreciated that various changes in form and detail may be made without departing from the spirit and scope of the invention(s) presently or hereafter claimed.

What is claimed is:

1. A vehicle diagnosis method executed in a device that communicates with a vehicle-mounted apparatus and includes a database that records an abnormal sound in association with a vehicle status, the method comprising:

acquiring a sound transmitted from the vehicle-mounted apparatus and produced in a traveling vehicle;

diagnosing a status of the vehicle based on the sound acquired; and transmitting diagnosis result data on the status of the vehicle to the vehicle-mounted apparatus to cause the vehicle-mounted apparatus to display a diagnosis result screen, wherein the diagnosis result data includes abnormal sound site information on a site where the abnormal sound is produced, a method of handling including information related to an action that a passenger of the vehicle should take, and evidence information on the abnormal sound site information and the method of handling, and the diagnosis result screen includes (i) an image indicating a position of an abnormal sound site based on the abnormal sound site information, (ii) at least one of sound waveform or frequency characteristics of the sound used in the diagnosis based on the evidence information, and (iii) the method of handling.

2. The vehicle diagnosis method according to claim 1, further comprising:

acquiring traveling data for the vehicle; and diagnosing the status of the vehicle based on the sound acquired and the traveling data acquired.

3. The vehicle diagnosis method according to claim 1, wherein an abnormal sound is detected by comparing current traveling sound acquired and traveling sound in normal times, and the status of the vehicle is diagnosed when the abnormal sound is detected.

4. The vehicle diagnosis method according to claim 1, wherein the diagnosis result screen further includes a button configured to receive an instruction from the passenger to request a use of an external service based on the method of handling, and when the button is pressed, data necessary to use the external service is transmitted to the external service.

5. The vehicle diagnosis method according to claim 1, wherein the vehicle-mounted apparatus includes at least one of a car navigation system or an In-Vehicle Infotainment system, and the sound transmitted from the vehicle-mounted apparatus and produced in the traveling vehicle is collected by a microphone mounted on the vehicle.

6. The vehicle diagnosis method according to claim 1, wherein the diagnosis result screen further includes a text indicating the position of the abnormal sound site based on the abnormal sound site information.

7. The vehicle diagnosis method according to claim 1, wherein the sound produced in the traveling vehicle is collected when the passenger of the vehicle enters a predetermined user operation.

8. The vehicle diagnosis method according to claim 1, wherein the acquiring acquires a first sound that is the sound transmitted from the vehicle-mounted apparatus and produced in the vehicle, and the vehicle diagnosis method further includes detecting an abnormal sound by comparing the first sound and traveling sound in normal times.

9. The vehicle diagnosis method according to claim 8, wherein the acquiring acquires a second sound that is the sound transmitted from the vehicle-mounted apparatus and produced in the vehicle after the abnormal sound is detected, and the diagnosing diagnoses the status of the vehicle based on the second sound.

10. An information presentation method executed in a vehicle-mounted apparatus that communicates with a device including a database that records an abnormal sound in association with a vehicle status, the method comprising:

transmitting a sound produced in a traveling vehicle to the device;

acknowledging diagnosis result data transmitted from the device and indicating a status of the vehicle based on the sound;

generating a diagnostic result screen based on the diagnosis result data; and outputting the diagnosis result screen to a display to be displayed on the display, wherein the diagnosis result data includes abnormal sound site information on a site where the abnormal sound is produced, a method of handling including information related to an action that a passenger of the vehicle should take, and evidence information on the abnormal sound site information and the method of handling, and the diagnosis result screen includes (i) an image indicating a position of an abnormal sound site based on the abnormal sound site information, (ii) at least one of sound waveform or frequency characteristics of the sound used in the diagnosis based on the evidence information, and (iii) the method of handling.

11. The information presentation method according to claim 10, wherein data for the sound used in a diagnosis by the device is saved.

12. The information presentation method according to claim 10, wherein the method of handling includes content that prompts one to use a predetermined service, and the information presentation method further includes communicating with an apparatus related to the service in accordance with a user operation of the passenger of the vehicle.

13. The information presentation method according to claim 12, wherein the diagnosis result data includes content that prompts a passenger to make a reservation for a check of vehicle by using an operator service.

14. The information presentation method according to claim 10, wherein the diagnosis result screen further includes a button configured to receive an instruction from the passenger to request a use of an external service based on the method of handling, and when the button is pressed, data necessary to use the external service is transmitted to the external service.

15. The information presentation method according to claim 10, wherein the vehicle-mounted apparatus includes at least one of a car navigation system or an In-Vehicle Infotainment system, and the sound produced in the traveling vehicle is collected by a microphone mounted on the vehicle and is transmitted to the device.

16. The information presentation method according to claim 10, wherein the diagnosis result screen further includes a text indicating the position of the abnormal sound site based on the abnormal sound site information.

17. The information presentation method according to claim 10, wherein data for the sound used in a diagnosis by the device, traveling data for the vehicle, and the diagnosis result data are saved.

18. The information presentation method according to claim 10, wherein the transmitting transmits a first sound that is the sound produced in the vehicle, and the method further includes acquiring an abnormal sound detection result transmitted from the device based on the first sound.

19. The information presentation method according to claim 18, wherein the transmitting transmits a second sound that is the sound produced in the vehicle after the abnormal sound detection result indicates that the abnormal sound is produced, and the acknowledging acknowledges the diagnosis result transmitted from the device and indicating the status of the vehicle based on the second sound.

* * * * *